7 Sheets. Sheet 1.

Franklin B. Prindle.

Impt. in the Manufacture of Clip King-bolts.

No. 119,643. Patented Oct. 3, 1871.

Witnesses.
A. H. LeMerle
C H Poole

Inventor.
F. B. Prindle, by
Prindle and Dyer, his
Attys.

7 Sheets. Sheet 3.

Franklin B. Prindle.
Impt. in the Manufacture of Clip King-bolts.
No. 119,643. Patented Oct. 3, 1871.

Witnesses. Inventor.

Franklin B. Prindle.

Impt. in the Manufacture of Clip King-bolts.

No. 119,643. Patented Oct. 3, 1871.

Witnesses.

Inventor.

7 Sheets.  Sheet 7.
Franklin B. Prindle.
Impt. in the Manufacture of Clip King-bolts.
No. 119,643.  Patented Oct. 3, 1871.
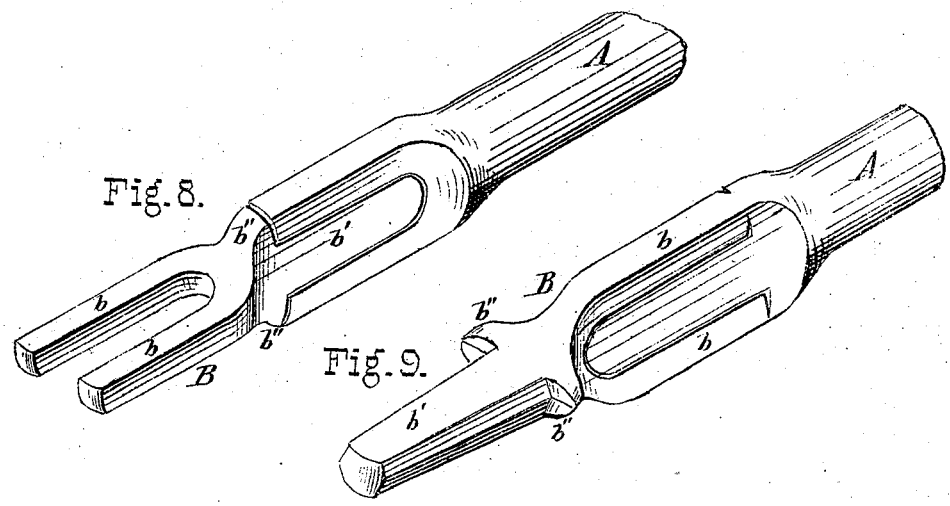
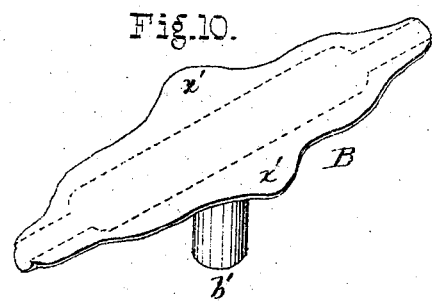
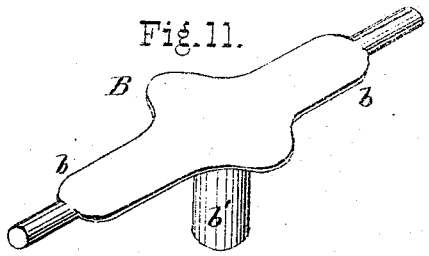
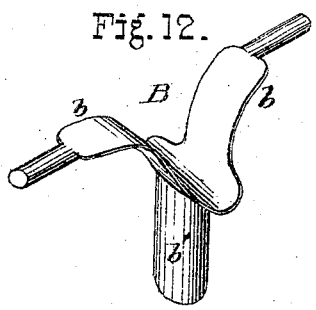
Witnesses.  Inventor.

UNITED STATES PATENT OFFICE.

FRANKLIN B. PRINDLE, OF SOUTHINGTON, CONNECTICUT, ASSIGNOR OF ONE-HALF HIS RIGHT TO JOHN DEEBLE, OF SAME PLACE.

IMPROVEMENT IN DIES FOR MANUFACTURING CLIP KING-BOLTS.

Specification forming part of Letters Patent No. 119,643, dated October 3, 1871.

*To all whom it may concern:*

Be it known that I, FRANKLIN B. PRINDLE, of Southington, in the county of Hartford and in the State of Connecticut, have invented certain new and useful Improvements in the Manufacture of Clip King-Bolts; and do hereby declare that the following is a full, clear, and exact description thereof, reference being had to the accompanying drawing making a part of this specification, in which—

Figure 1:
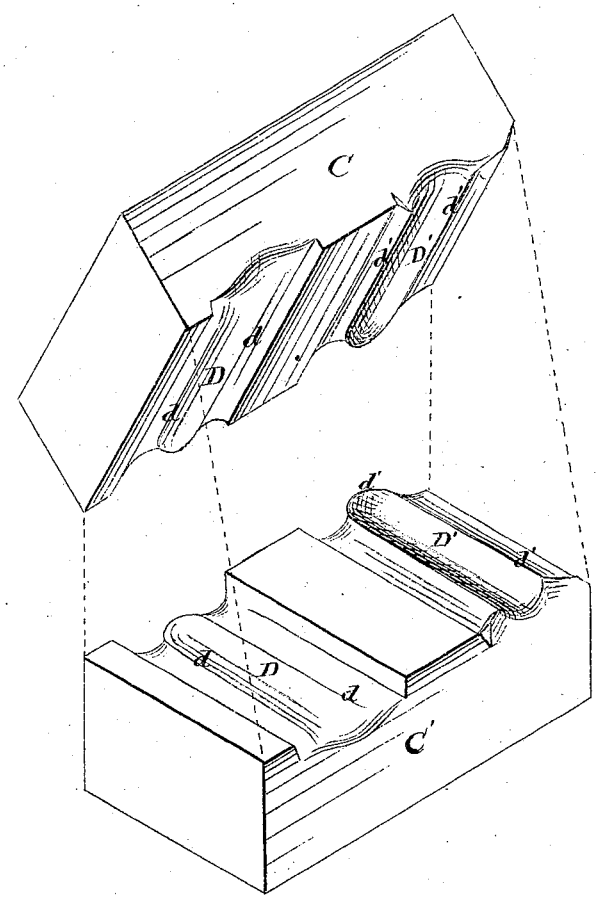
Figure 2:
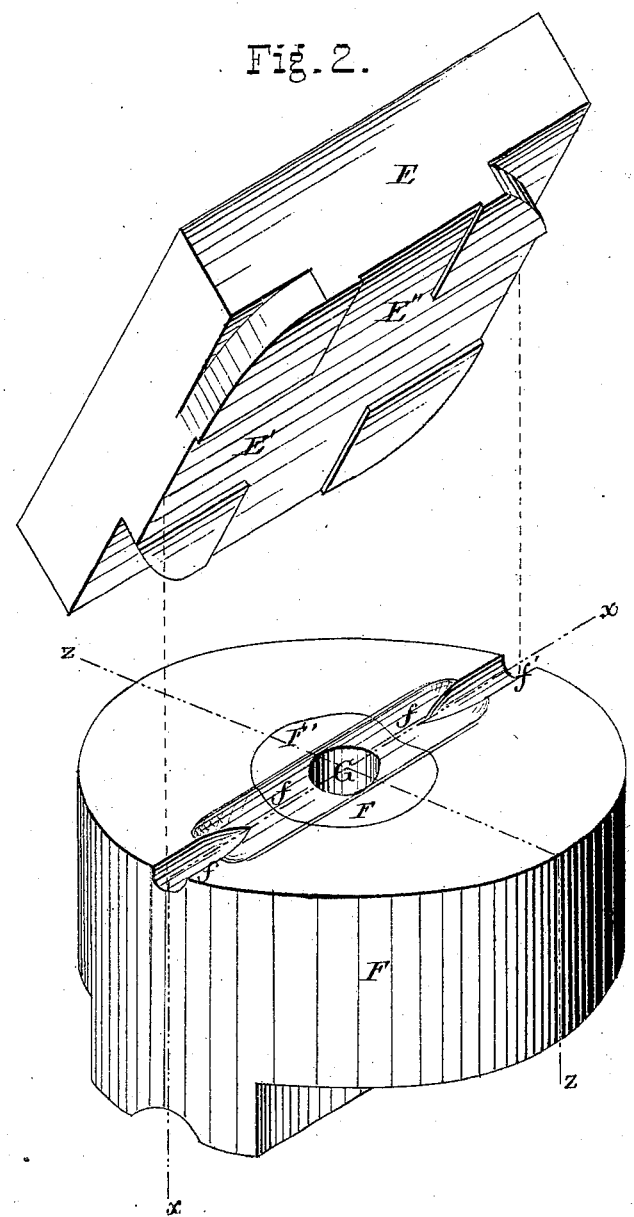
Figure 3:
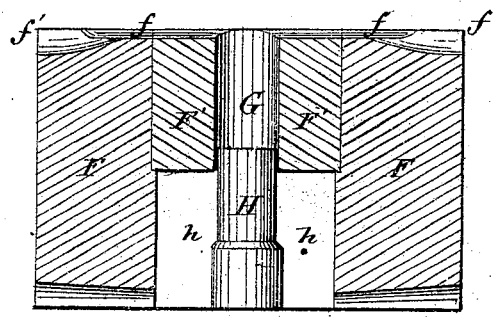
Figure 4:
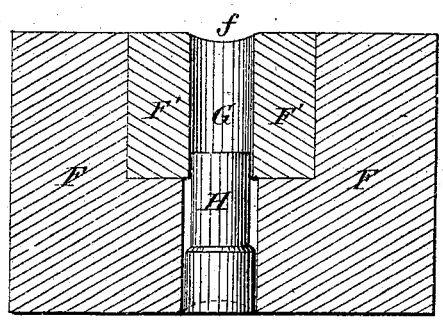
Figure 5:
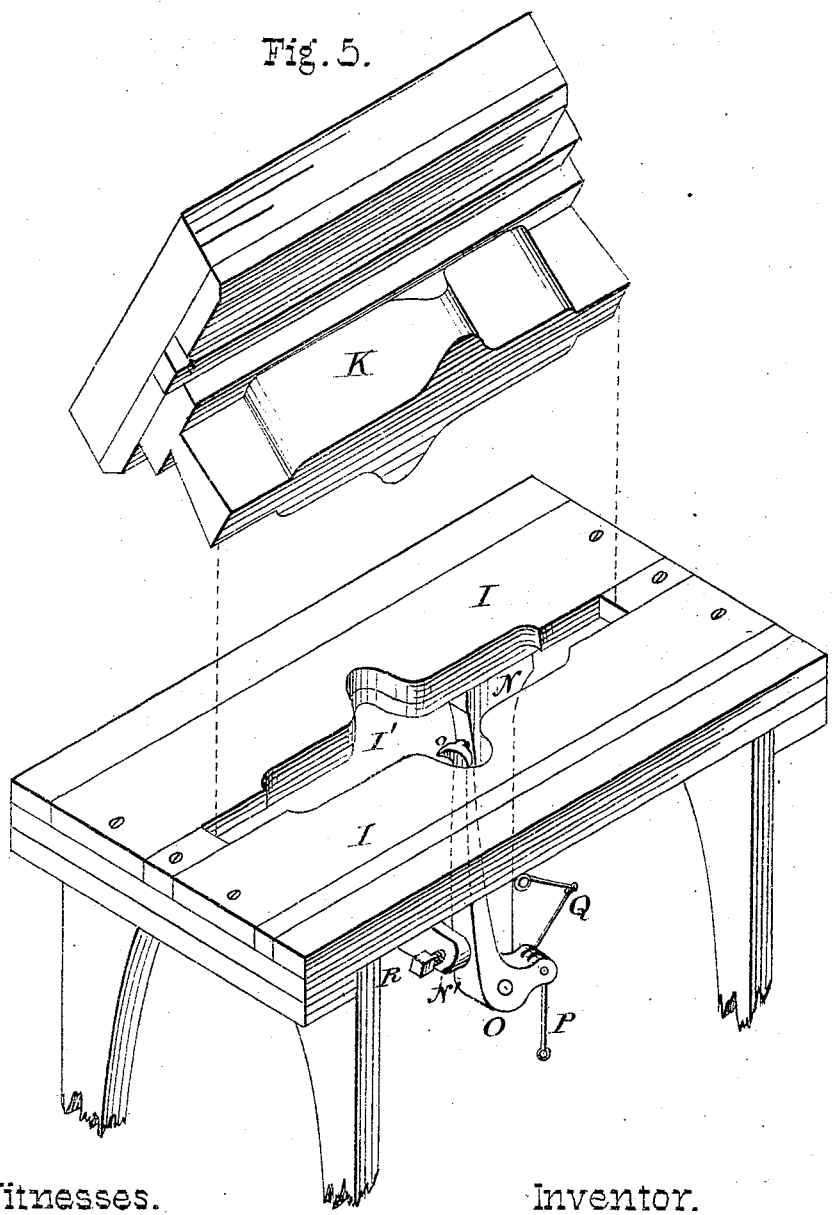
Figure 6:
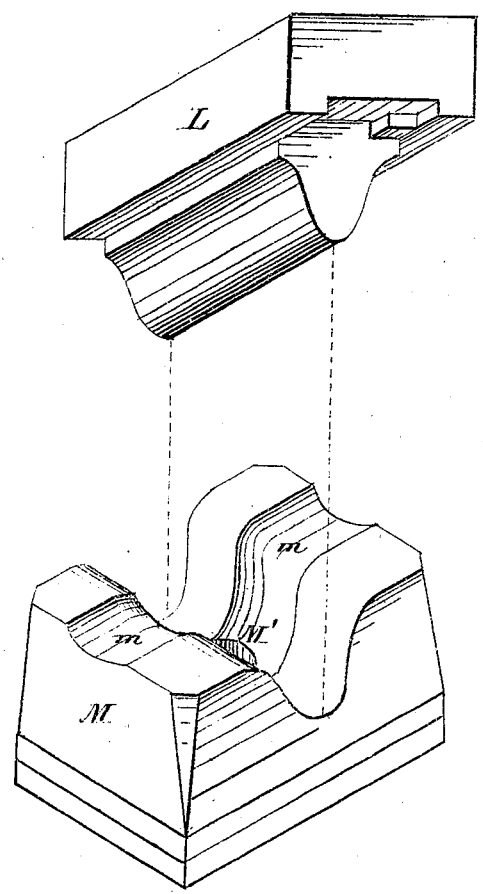
Figure 7:
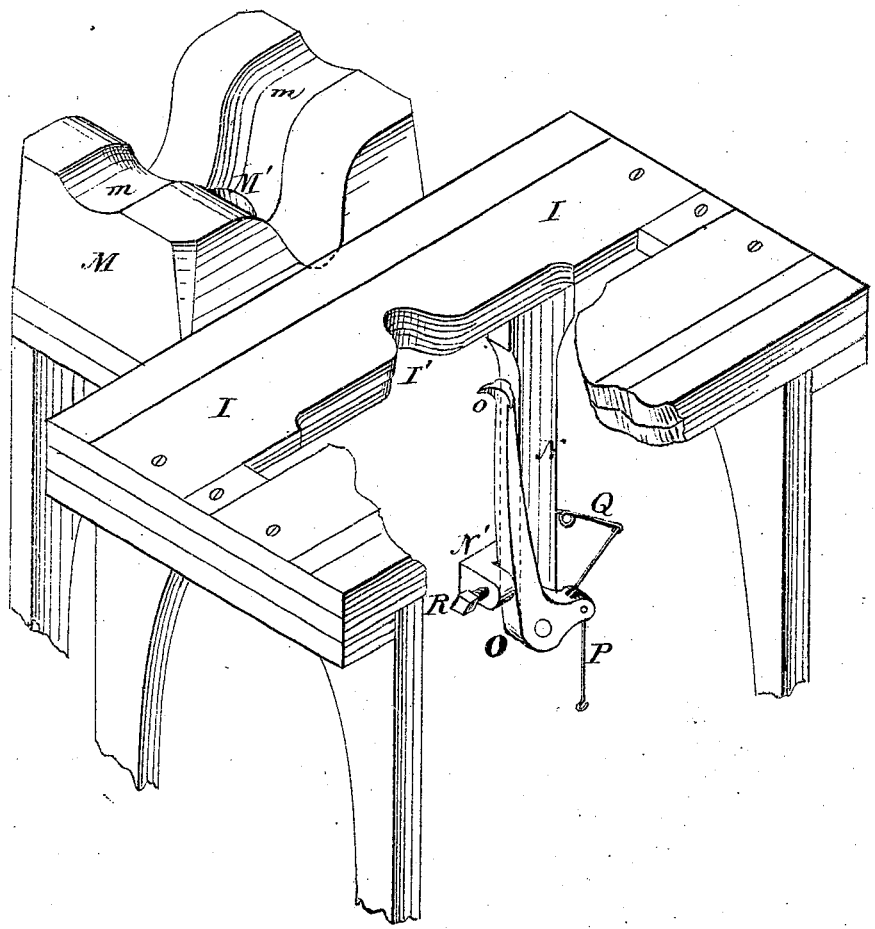

Figure 1 is a perspective view of the upper and lower dies, for forming upon and cutting from a bar of iron the blank used in constructing the king-bolt. Fig. 2 is a like view of the forming-dies used. Figs. 3 and 4 are vertical central sections of the lower forming-die on the lines $x\ x$ and $z\ z$, respectively, of Fig. 2. Fig. 5 is a perspective view of the trimming-dies. Fig. 6 is a like view of the bending-dies. Fig. 7 is a perspective view of the lower trimming and bending-dies as combined and arranged for use, with a portion of said trimming-die broken away so as to show the adjustable gauge. Figs. 8 and 9 are perspective views of two bars of iron, having formed upon and partly cut from one end of each the blank for a king-bolt. Fig. 10 shows the blank after having passed through the forming-dies. Fig. 11 represents the same after having had the surplus metal removed by the trimming-dies, and Fig. 12 shows the king-bolt as left by the bending-dies.

Letters of like name and kind refer to like parts in each of the figures.

The object of my invention is to decrease the cost of clip king-bolts by lessening the waste of metal and the amount of time and labor usually required in their production; and it consists, principally, in the blank from which the king-bolt is constructed, substantially as is hereinafter specified. It consists, further, in the dies used for forming the blank, substantially as is hereinafter shown and described. It consists, further, in the peculiar construction of the lower forming-die, substantially as and for the purpose hereinafter set forth. It consists, further, in the shaping-dies, constructed substantially as and for the purpose hereinafter shown. It consists, further, in the series of dies employed for forming the clip king-bolt, substantially as is hereinafter specified. It consists, finally, in the adjustable pivoted gauge used with the trimming-dies, when constructed substantially as and for the purpose hereinafter shown and described.

As the method, dies, and blanks employed by me in the manufacture of king-bolts are used in connection with each other their description will, as a matter of necessity as well as of convenience, be in connection.

In constructing the blank king-bolt I preferably employ a round bar of iron, A, one end of which is heated and flattened under suitable dies upon opposite sides to a distance equal to about one-half the length of said blank. The bar is then turned one-fourth of a revolution and again placed under said dies so as to form immediately above the same a second flattened portion corresponding in length and width to that first formed, but having its faces placed at a right angle therewith. The bar thus prepared is placed under suitable dies and the central portion of the flattened end removed, so as to leave two prongs, $b$, having a sufficient size and length to form the clip portion of the king-bolt, after which the second flattened portion of said bar is submitted to the action of said dies, which removes its central portion, as before, so as to form the clip portion of another blank, and also disengage the first blank B by means of two lateral cuts extending outward from the central opening between the prongs of the second blank, which lateral cuts also define and complete the ends of said prongs. The blank B is now completed, and, as seen in Fig. 8, consists of two prongs, $b$, joined together in a curve, and a bar, $b'$, having a rectangular shape transversely, and provided at its inner end and upon opposite edges with two shoulders, $b''$, which end is united to the joined ends of said prongs, but with its sides placed at a right angle with the faces of the same. In use the prongs $b$ form the clip portion of the device, the shoulders $b''$ the lips of the same, while the bar $b'$ forms the bolt. It will be seen that the bar $b'$ of one blank exactly corresponds with and is removed from the space between the prongs $b$ of the next blank above, so that in the production of said blanks no waste of metal is occasioned, except at the ends of the bar A, where one set of prongs, $b$, and one intervening bar, $b'$, are spoiled in commencing and ending the work. To construct this blank I employ two dies, C and C', having formed within corresponding portions of their contiguous faces two sets of depressions, the first of which set, D, have each the exact form of one of the upper flattened sides of the blank bar A, and, in addition thereto, are each provided with a slight ridge, $d$, that corresponds to and marks the line of the cut—that is, to remove therefrom a blank—while the second set of depressions, D', correspond in general form with the first, except that their ridges $d'$ are sufficiently raised to form cutting-edges, which, when said dies are closed together, meet and sever the intervening metal.

The dies thus constructed being placed within a drop-press or other suitable operating mechanism, whereby the upper die may at will be caused to impinge upon its mate, the heated end of the bar A is placed within the forming-depressions D so as to give it the desired shape, after which, and without reheating, it is transferred to the cutting-depressions and the metal between the prongs of the blank removed. The metal is now reheated and again placed under the forming portion of the dies C, so as to form a second flattened section above and at a right angle to that upon the end of the bar, after which said bar is changed so as to bring said last-formed flattened portion under the cutting portion of said dies and sever therefrom a completed blank.

If desired, the bar A can be placed within the dies C and C' from the opposite side, so as to reverse the position of the blank B and bring the bar $b'$ instead of the prongs $b$ upon the end. The result obtained is the same, however, whichever side said bar is inserted from.

The next operation consists in giving to the various parts of the blank the general form they are required to possess in the finished device, for which purpose a second set of dies, E and F, is employed. The lower die F has, preferably, a circular form at its upper end and a horizontal diameter corresponding to the united lengths of the clip-arms when spread outward. A circular opening, G, corresponding in size with the bolt end $b'$ of the finished device, passes vertically downward through the center of the die F, while from the upper end of said opening extends radially outward in opposite directions to within a short distance of the edges of said die a semicircular groove, $f$, that corresponds in transverse size with the wings of the clip $b$. From opposite sides of the die extend inward into the grooves $f$ two other grooves, $f'$, which, while formed upon a smaller circle than the first, are cut deeper into the face of said die, and near their inner ends extend inward and upward, so as to terminate at a short distance within the outer ends of the same, said outer grooves corresponding in size and position to the rounded ends of the clips, which are intended for threading.

The lower end of the upper die E corresponds in general size and shape with the upper end of the lower die F, and has cut within its otherwise plane lower face two square grooves, E' and E'', which extend across and intersect each other at the center of the same; and when said die is in position with relation to the lower die are so placed as that one of said grooves shall coincide with and come directly over the groove within the latter. A suitable gauge-pin, H, being placed within the opening G of the lower die and the latter and said upper die combined with the necessary operating mechanism, the blank B is heated, its single end $b'$ placed within said opening G, and its divided end $b$ spread outward by a few blows of a hand-hammer, after which a few blows of the upper die will cause said blank to conform to and fill the depressions within said lower die and force the surplus metal laterally outward in the form of a fin, $x$, as shown in Fig. 10. Upon being removed from the forming-dies the blank is placed within or over a trimming-die, I, having a plane upper face and a central opening, I', exactly corresponding in size and shape to the exterior of the flattened clip when finished, and is forced through said opening, and the fin $x'$ removed by means of an upper die, K, which corresponds in size with said opening I', and has an exterior size sufficient to permit it to pass through the same. The king-bolt is now ready for the last operation, which consists in giving to the clip portion the shape shown in Fig. 12, the rounded ends being turned outward in opposite directions and in a line with each other so as to be in convenient position for threading. To give to the clip this form I employ two dies, L and M, the lower of which, M, has its upper face formed in one direction upon a line corresponding to the desired longitudinal shape of said clip, and in an opposite direction upon a horizontal line, and is provided at its center with an opening, M', for the reception of the bolt end of the device, from which opening extends upward and outward a groove, $m$, that corresponds with and receives the lower or outer face of the clip. The upper die L corresponds in size and shape upon its lower face to the upper face of said lower die above the depression or groove $m$, and is operated in connection with said die in the usual manner.

In constructing king-bolts by my method the waste of stock by trimming is but trifling, and can be readily controlled by varying the relative proportions of the blank. The waste from heating is comparatively nothing, as but two heats are required, (one for forming the blank and one for completing the bolt,) while the structure of the metal is so little changed as to render the finished article much stronger than those in common use. In addition to the above, the time and labor required in the production of the king-bolts are materially less than has heretofore been possible; and from this and the before-named reasons the article of manufacture can be furnished at a comparatively small cost.

In constructing the lower forming-die F, which is made of or from cast metal, I give to it a circular form horizontally, in order that it may be strengthened by means of wrought-metal hoops or bands, which are shrunk upon its periphery; and in order to insure an increase of wear and lessen the expense of keeping up said die, its center is recessed out vertically, and a cast-metal bushing, F', fitted within and driven into said recess, which bushing, now forming a part of said die, is provided with the vertical opening G and with the groove $f$. The bushing F' being so firmly fixed within the die F as to require a considerable force for its removal it has been found that the opening required for the head of the gauge or push-pin H was too small in size to contain a drift having sufficient strength and bearing-surface upon its upper end to remove said bushing. In consequence of this difficulty an opening, $h$, is provided within the die F, and extends from its lower side vertically upward to the lower side of the bushing, and horizontally to or near the periphery of the same, with a width corresponding to the diameter of the head of the gauge-pin H, which opening not only serves to remove said bushing without injury to its lower surface, but also permits the free escape of scale and dirt from the opening G.

In order that the plane trimming-dies (which cost less originally and for repairs) may be employed with advantage a guage is required for receiving the bolt end of the king-bolt, which gauge must be removable in order that the bolts may drop freely downward from the dies when trimmed. To accomplish this object I pivot to or upon a standard, N, connected with the framework that supports the trimming-die, a lever, O, having the form shown in Fig. 7, its long arm being placed in nearly a vertical position with its upper forked end $o$ in the exact position required to cause it to bear lightly against the bolt end of a king-bolt placed upon and adjusted to position with relation to said die. The short arm of said lever extends horizontally outward, and is connected, by means of a rod, P, with the treadle of the press, so that when said treadle is depressed and the upper die caused to descend and force a king-bolt through said lower die the upper arm of said gauge-lever will be removed to a sufficient distance to escape contact with said king-bolt as it drops downward. A spring, Q, attached to the outer end of the short arm of the lever O, and connected with the standard N, returns said lever to position whenever the treadle rises.

In order to permit the gauge to be adjusted to or form the vertical center of the die so as to enable its use with bolts having different sizes, the forward side of the vertical arm rests against a set-screw, R, that passes through the arm N' of the standard N, so that by adjusting said screw toward or from said lever a corresponding change will be effected in the position of the forked end of the latter with relation to the center of the trimming-die.

Having thus fully set forth the nature and merits of my invention, what I claim as new is—

1. The blank B, constructed in the manner and for the purpose substantially as specified.
2. The dies C and C', constructed as shown, and combined with each other and with suitable operating mechanism, substantially as and for the purpose described.
3. The lower forming-die F, made cylindrical horizontally and provided with the central perforated bushing F', substantially as and for the purpose shown.
4. The shaping-dies L and M, constructed and combined substantially as and for the purpose set forth.
5. The series of dies C, C', E, F, I, K, L, and M, when constructed and combined substantially as and for the purpose specified.
6. In combination with the trimming-die I the gauge O and $o$ pivoted to or upon the supporting frame of the press, made adjustable by means of the set-screw R, and connected with the press-treadle, in the manner and for the purpose substantially as shown.

In testimony that I claim the foregoing I have hereunto set my hand this 19th day of June, 1871.

FRANKLIN B. PRINDLE.

Witnesses:
EDWARD W. LOWREY,
WALTER S. MERRELL. (22)